UNITED STATES PATENT OFFICE.

JACOB REESE, OF PITTSBURG, PENNSYLVANIA.

METHOD OF PRODUCING DIFFERENT GRADES OF STEEL FROM THE SAME HEAT OF METAL.

SPECIFICATION forming part of Letters Patent No. 245,657, dated August 16, 1881.

Application filed April 9, 1881. (No specimens.)

*To all whom it may concern:*

Be it known that I, JACOB REESE, a citizen of the United States, residing at Pittsburg, county of Allegheny, and State of Pennsylvania, have invented certain new and useful Improvements in Methods of Producing Different Grades of Steel from the Same Heat of Metal; and I do hereby declare the following to be a full, clear, and exact description thereof.

My invention consists in a new and useful method for the production of different grades of steel in the same heat of metal, which consists, essentially, in first decarburizing and desiliconizing the metal, and then subjecting it to a series of resiliconizing, recarburizing and refining operations between different casts which are made from the same heat or bath of metal, whereby different grades of steel having determined amounts of carbon and silicon, and possessing a solid homogeneous structure may be produced.

At present the trade calls for small quantities of steel having different degrees of carbon, according to the purpose for which the steel is to be used, the amount of carbon in the steel to be made varying from .05 (or the one-twentieth of one per cent.) to 1.50, (or one and one-half per cent. of the weight of the metal.) It is practically impossible to keep in stock the almost infinite grades and qualities of steel required for such orders; therefore it has been usual to produce them from time to time by the use of the crucible process, as small quantities of different qualities of steel possessing different grades of carbon may be readily made by the use of that process. Heretofore it has been impossible to meet such demands by the use of the Bessemer or open-hearth process, because they each produce a large mass of metal having a uniform degree of carburization. This renders them peculiarly adapted for the production of steel to fill orders for rails, structural material, and for other purposes wherein it is desirable to secure large quantities of metal having a uniform degree of carburization, but renders them unfit for the production of merchant steel, steel castings, and material for various other purposes.

The object of my invention is to secure solid steel castings or ingots in small quantities having different degrees of carburization by the use of either of these processes, which object I secure by treating the metal in the manner which I shall hereinafter describe.

In the adaptation of my improvement to the Bessemer process I make use of an improved plant provided with means for introducing air and combustible gas into the converter, and above the surface of the metal, for the purpose of maintaining it at a high degree of fluidity after decarburization and desiliconization has been effected—for instance, such a plant as is described by me in an application filed in the United States Patent Office on the 11th day of February, 1881, in which the converter is provided with two hollow trunnions and pipes leading therefrom into a tuyere-box having two distinct compartments for the admission of air through either or both of the compartments for the purpose of decarburizing and desiliconizing the molten metal, and also for the admission, after the converter is turned down, of air through one of the compartments and gas from a producer through the other to cause combustion to take place over the metal in order to maintain its temperature during its further treatment.

In the practice of my improvement by the use of the Bessemer plant the metal is run into the converter and decarburized and desiliconized by an air-blast in the usual manner. The converter is then turned down so that the tuyeres are above the surface of the metal. Silicious pig, as high in silicon and as low in carbon as can be procured, is then added in certain proportions, (which I shall specifically explain hereinafter,) in order to deoxygenize the molten mass and to impart sufficient silicon to prevent oxidation of the carbon to be added. The metal is then recarburized up to the degree required for the first cast. The air and gas are then forced into the converter and consumed above the surface of the metal, and the metal is held at a state of rest and exposed to a dead melt until the occluded gases are set free. A portion of the metal is then cast. The necessary quantity of silicon is added to protect the carbon in the remainder until the next cast is to be made. Additional carbon is then added to produce the next grade desired, and the metal is subjected to a dead melt, as in the preceding instance, and the resiliconizing, recarburizing, refining, and casting operations are continued in this manner until all the grades desired, from the lowest to the highest degree of carbon, are successively produced from the same blow of the metal.

The addition of silicon to the molten decarburized and desiliconized metal previous to recarburization serves, first, to deoxygenize it, and, second, to protect the carbon (which is afterward added) until the first cast is to be made. The quantity of silicon to be added at the first step will be regulated by the amount of oxygen contained in the decarburized and desiliconized metal, the time it is desired to hold the metal at a state of rest after recarburizing, and the amount of silicon which the first cast is to contain. For instance, suppose the charge of metal is ten thousand pounds, and contains .36 of oxygen, and it is desired to hold it at a state of rest for thirty minutes after recarburizing and until the first cast is to be made. In this case it would require thirty-two pounds of silicon to remove the oxygen from the metal, and fifty pounds to protect the carbon from oxidation, making a total of eighty-two pounds of silicon required to remove the oxygen and hold the metal at a state of rest until the first cast is made, at which time the silicon which has been incorporated in the metal will be reduced down to a low degree, and therefore, if it is desired to produce a metal containing over .020 per cent. of silicon, the amount required should be added to the eighty-two pounds before mentioned.

After the first cast has been made the quantity of silicon added should be just sufficient to prevent the oxidation of the carbon (afterward added) until the second cast is made, and to impart the desired per cent. of silicon to the resultant product, and as the metal has already been deoxygenized by the addition of the silicon previous to recarburization in the first instance, the amount required for the second step would be the one-twentieth of one per cent. (.050) of the weight of the remainder of the metal, to prevent oxidation of the carbon during the next thirty minutes, and, in addition thereto, such an amount of silicon as may be desired in the next cast.

The percentage of silicon required simply to prevent the oxidation of the carbon for varying lengths of time is as follows: If the metal is to be held at a state of rest for ten minutes, and the resulting product is not to contain more than two one-hundredths of one per cent. (.02) of silicon, it should be charged with three one-hundredths of one per cent of its weight of silicon. If it is to be held for twenty minutes it should be charged with four one-hundredths of one per cent. of its weight of silicon. If it is to be held thirty minutes five one-hundredths of one per cent. of its weight of silicon will be required. Forty minutes rest will require six one-hundredths of one per cent. Fifty minutes will require seven one-hundredths of one per cent. Sixty minutes will require eight one-hundredths of one per cent. Seventy minutes will require one-tenth of one per cent. Eighty will require twelve one-hundredths of one per cent. Ninety will require fourteen one-hundredths of one per cent. One hundred minutes will require two hundred and five one-thousandths of one per cent. One hundred and ten minutes will require two hundred and fifty-four one-thousandths of one per cent. One hundred and twenty minutes will require three-tenths of one per cent. One hundred and thirty minutes will require fifty-two one-hundredths of one per cent. One hundred and forty minutes will require seventy-five one-hundredths of one per cent. One hundred and fifty minutes will require one per cent. One hundred and sixty minutes will require one and two-tenths of one per cent. One hundred and seventy minutes will require one and four-tenths of one per cent; and if the metal is to be kept at a state of rest for three hours, or one hundred and eighty minutes, one and six-tenths of one per cent. is required to be added to prevent the oxidation of the carbon.

In conducting the process it must be kept in mind that the preceding amounts only represent that portion of the charge of silicon to be added which is used to prevent the oxidation of the carbon and hold the metal at a state of rest from the time it is recarburized until it is cast, and does not include the amount which is required (previous to the first recarburization) to deoxygenize the metal, nor does it represent any portion of silicon which may be desired in the resultant product.

When large steel castings are desired to be produced the amount of silicon may be increased for the purpose of giving fluidity to the metal, and to cause it to run more freely into the form of the molds; and where castings are to be produced in which the presence of silicon in moderately large amounts is not objectionable, sufficient silicon may be incorporated in the first step to hold the metal in a state of rest during the succeeding steps and to prevent the oxidation of the fresh charges of carbon.

Having described my invention, what I claim, and desire to secure by Letters Patent, is—

1. The method herein described of producing from the same bath of metal different grades of steel having various and determined grades of carbon and silicon, and of a close solid texture, which consists in decarburizing and desiliconizing the molten metal and then subjecting it to a resiliconizing, recarburizing, and a refining operation between the different casts, substantially as herein set forth.

2. The method herein described of producing from the same bath of metal different grades of steel having various and determined amounts of carbon and of a close solid texture, which consists in decarburizing and desiliconizing the molten metal, adding thereto a sufficient amount of silicious metal to deoxygenize the bath and to prevent the elimination of the carbon during the subsequent treatment, and
5 then subjecting the metal to a series of recarburizing and refining operations between the different casts.

In testimony whereof I, the said JACOB REESE, have hereunto set my hand this 7th day of April, 1881.

JACOB REESE.

Witnesses:
WALTER REESE,
J. M. ROURKE.